United States Patent
Grosch et al.

(10) Patent No.: US 10,310,470 B2
(45) Date of Patent: Jun. 4, 2019

(54) UPDATE FOR AN AUTOMATION INSTALLATION IN THE COURSE OF OPERATION (71) Applicant: SIEMENS AKTIENGESELLSCHAFT, München (DE)

(72) Inventors: Thomas Grosch, Rosstal (DE); Jan Richter, Lauf an der Pegnitz (DE)

(73) Assignee: SIEMENTS AKTIENGESELLSCHAFT, München (DE)

( * ) Notice: Subject to any disclaimer, the term of this patent is extended or adjusted under 35 U.S.C. 154(b) by 257 days.

(21) Appl. No.: 15/305,926

(22) PCT Filed: Apr. 22, 2014

(86) PCT No.: PCT/EP2014/058114
§ 371 (c)(1),
(2) Date: Oct. 21, 2016

(87) PCT Pub. No.: WO2015/161865
PCT Pub. Date: Oct. 29, 2015

(65) Prior Publication Data
US 2017/0052523 A1  Feb. 23, 2017

(51) Int. Cl.
G05B 19/042 (2006.01)
G05B 19/05 (2006.01)
(Continued)

(52) U.S. Cl.
CPC ....... G05B 19/0426 (2013.01); G05B 13/042 (2013.01); G05B 19/056 (2013.01);
(Continued)

(58) Field of Classification Search
CPC ............................................... G05B 19/0426
(Continued)

(56) References Cited

U.S. PATENT DOCUMENTS 6,976,079 B1 * 12/2005 Ferguson ............... G06F 8/65
709/203
7,107,329 B1 * 9/2006 Schroder ............ H04L 41/0213
709/221
(Continued)

FOREIGN PATENT DOCUMENTS

CN  1420999 A   5/2003
CN  101515834 A  8/2009
(Continued)

OTHER PUBLICATIONS

Kimber, Douglas A., et al. "Modeling planned downtime." Bell Labs technical journal 11.3 (2006): pp. 7-19. (Year: 2006).*
(Continued)

Primary Examiner — Satish Rampuria
(74) Attorney, Agent, or Firm — Henry M. Feiereisen LLC (57) ABSTRACT A method for stipulating a starting time for an update for a control apparatus that controls at least one peripheral component in a process automation installation by producing control outputs is disclosed. The update requires at least one predetermined down time. The invention is based on a suitable starting time for performing an update in order to perform an update in the course of operation of a process automation installation without risk. The method involves detecting a current operating state for the at least one peripheral component, taking the detected operating state as a basis for using a controlled system model of the process to simulate what state trajectory the at least one peripheral component negotiates within the down time for a predetermined static control output, and checking whether the state trajectory lies exclusively within a range of admissible operating states, and, if appropriate, starting the update.

14 Claims, 4 Drawing Sheets (51) Int. Cl.
 *G06F 8/656* (2018.01)
 *G05B 13/04* (2006.01)

(52) U.S. Cl.
 CPC .... *G06F 8/656* (2018.02); *G05B 2219/13004* (2013.01); *G05B 2219/50129* (2013.01)

(58) Field of Classification Search
 USPC ................................ 700/28–37; 717/168–178
 See application file for complete search history.

(56) References Cited

U.S. PATENT DOCUMENTS

| | | | | |
|---|---|---|---|---|
| 7,168,075 | B1 | 1/2007 | Barthel et al. | |
| 7,406,399 | B2* | 7/2008 | Furem | E02F 9/267 |
| | | | | 37/379 |
| 7,590,589 | B2* | 9/2009 | Hoffberg | G06Q 20/401 |
| | | | | 705/37 |
| 2005/0076325 | A1* | 4/2005 | Bergin | G06F 8/65 |
| | | | | 717/100 |
| 2010/0262263 | A1 | 10/2010 | Chong | |
| 2012/0311556 | A1* | 12/2012 | Matsukawa | G06F 8/654 |
| | | | | 717/171 |
| 2013/0318041 | A1 | 11/2013 | Grosch | |
| 2014/0006574 | A1* | 1/2014 | Fischer | H04L 63/20 |
| | | | | 709/221 |

FOREIGN PATENT DOCUMENTS

| | | |
|---|---|---|
| CN | 103425530 A | 12/2013 |
| CN | 103454959 A | 12/2013 |
| EP | 2680529 A1 | 1/2014 |
| JP | 2011176923 A | 9/2011 |

OTHER PUBLICATIONS

Smith, John D., Susila Ramamoorthy, and Yong N. Tang. NSLS control system upgrade. No. BNL—61019. Brookhaven National Lab., 1995.pp. 1-5 (Year: 1995).*

Schwedler, M. Lopez. "Status Update of the Power Conditioning System in the National Ignition Facility." (2012).pp. 1-6 (Year: 2012).*

* cited by examiner

UPDATE FOR AN AUTOMATION INSTALLATION IN THE COURSE OF OPERATION

CROSS-REFERENCES TO RELATED APPLICATIONS

This application is the U.S. National Stage of International Application No. PCT/EP2014/058114, filed Apr. 22, 2014, which designated the United States and has been published as International Publication No. WO 2015/161865 A1, pursuant to 35 U.S.C. 119(a)-(d).

BACKGROUND OF THE INVENTION

The invention relates to a process automation installation in which a control apparatus, for example a programmable logic controller, controls at least one peripheral component, by means of which the process is carried out, that is to say electrical energy is produced from coal or bottles are filled, for example. In particular, the invention relates to the stipulation of a suitable time in order to update the operating software of the control apparatus, that is to say carry out an update, without the process having to be interrupted for this purpose.

Highly available solutions which minimize possible downtimes of an automation installation or installation for short are increasingly being required in the automation environment. The development of such highly available solutions is very cost-intensive.

An important function of a highly available automation system is to update the system software or operating software in the course of operation. Another name for operating software is also firmware. An update may be necessary if error corrections in the firmware are intended to be loaded into a running system which must not be stopped for this purpose. This so-called failover during an update is never entirely reactionless for the process. However, a smooth failover is usually required, that is to say it must not be possible to detect any sudden change in the profile of the control signals, which has been caused only by the interruption but not by inherent process changes, at the outputs of the control apparatus, that is to say the inputs of the peripheral components. For example, a control signal therefore must not suddenly fall to the value 0 during the update if a control signal having a value not equal to 0 is actually needed to control the process. The outputs of the control apparatus must therefore constantly behave. A limited period of time in which the outputs retain at least their last value, before the control of the process is then continued either by the control apparatus which is ready for operation again after the update or by a backup CPU, that is to say a further control apparatus, is usually tolerated.

An update must not destabilize the process. However, the user nowadays answers these questions only on the basis of the empirical values relating to his process or similar processes. For this purpose, it is nowadays necessary for the operator of the automation installation to assess, on the basis of empirical values, whether the process to be controlled tolerates the effects of an update.

SUMMARY OF THE INVENTION

The invention is based on the object of determining a suitable starting time for carrying out an update in a control apparatus in order to carry out an update in the course of operation of a process automation installation without risk.

The object is achieved by means of the subject matters of the independent patent claims. Advantageous developments of the invention emerge from the features of the dependent patent claims.

The invention provides a method which is used to stipulate the starting time for the update for the control apparatus. In this case, it is assumed that the control apparatus previously controls the at least one peripheral component in the process automation installation in a manner known per se by producing control outputs. In connection with the invention, a peripheral component should be understood as meaning, in particular, a sensor device, for example a temperature sensor or a light barrier, or an actuator, for example a heating element or an electrical drive, for example for a conveyor belt, or a controllable valve.

It is assumed that at least a predetermined downtime is therefore required for the update in the shortest case. In the method, a current operating state or state of the at least one peripheral component is now detected. This detected state is then taken as a basis for using a controlled system model of the process to simulate what state trajectory, that is to say what temporal sequence of states, the at least one peripheral component would run through within the downtime if a predetermined stationary control output were output by the control apparatus.

A check is carried out in order to determine whether the state trajectory is solely within a range of permissible operating states. In other words, a check is carried out in order to determine whether the state trajectory runs within a state space which is formed from the set of permissible operating states, that is to say those operating states for which the process and/or the at least one peripheral component respectively has/have a permissible operating value, for example a temperature or speed or application of force. The current operating state determined is therefore composed of state variables of the controlled system which is regulated by the control apparatus for the purpose of automating the process.

The update is started only if the state trajectory is entirely within the permissible range for the downtime. This results in the advantage that, if the control apparatus does not react to changes in the process with updated control outputs on account of the update, the process nevertheless does not assume an impermissible operating state during the downtime.

If the state trajectory indicates a harmless failover, according to one development of the invention, in order to start the update, the stationary control output is then actually output to the at least one peripheral component and, in the meantime, the control apparatus is decoupled and the update is initiated during interruption-free operation of the process automation installation. This results in the advantage that the process continues. As a result of being decoupled during the update, the control apparatus also does not output any incorrect control outputs caused by the update process to the at least one peripheral component.

According to one preferred embodiment, a takeover signal is emitted to a further control apparatus of the automation installation after the update has been started and within the downtime so that the further control apparatus outputs further control outputs to the at least one peripheral component, that is to say continues to regulate the process. This results in the advantage that the update itself can last longer than the downtime without the process having to be interrupted.

According to the invention, the controlled system model is a model of a controlled system comprising the at least one peripheral component. This results in the advantage that it is possible to resort to a model which generally already exists for an automation installation. For example, there may be a model of a controlled system for regulated operation on the basis of an observer, for example a Luenberger observer, which model can also be used to determine the state trajectory. The simulation may involve, for example, solving a differential equation which results from the controlled system model as a description of the dynamic behavior of the controlled system.

Additional safety arises if a check in order to determine whether there is a safe operating state is not only carried out for the downtime, but rather, in order to check the state trajectory by means of the simulation, a time at which the state trajectory comprises an impermissible operating state for the first time is determined. This time is used to determine a maximum permissible time horizon. A check is then carried out in order to determine whether the downtime is less than the time horizon or less than the time horizon minus a predetermined buffer time, which is even safer.

The text above described only the situation in which the simulation is used to determine that the state trajectory is always in the range of permissible operating states within the downtime. The update is preferably delayed if there is no permissible state trajectory.

In this case, a further advantage results if the delay is not immediately triggered for the very first state trajectory, but rather, if the state trajectory is at least partially outside the range of permissible operating states within the downtime, a further state trajectory is initially respectively determined for at least one further predetermined stationary control output. In other words, a check is carried out in order to determine whether there is a suitable control output which allows the update to be carried out at the current time. The update is then delayed only if the check of all predetermined stationary control outputs provides a negative result.

According to another advantageous development, a predetermined safety control output which controls the at least one peripheral component into a predetermined safe state is provided. This safe state can also be configured to the effect that the process is interrupted or terminated. This safety control output is output to the at least one peripheral component if a fault state is detected and signaled in the control apparatus and/or the at least one peripheral component after the update has been started. This results in the advantage that the automation installation which continues to run without regulation during the downtime is not damaged if a fault occurs.

As already stated, it is necessary to ensure that the control apparatus is decoupled and is coupled to the at least one peripheral component again smoothly, that is to say a smooth failover is reliably ensured. For this purpose, according to one embodiment of the method, the control apparatus is coupled to the at least one peripheral component again after the update, and restart values which either correspond to the stationary control output or are determined using the state trajectory are output by the control apparatus as the first control output after coupling. If the restart values are determined using the state trajectory, the state trajectory is used, in particular, to determine the state in which the process would have to be at the end of the update according to the simulation, so that a suitable control output can be determined for this state and can be output to the at least one peripheral component.

According to an alternative embodiment, the control apparatus is coupled to the at least one peripheral component again after the update, and those restart values which are determined by means of synchronization with a further control apparatus which was coupled to the at least one peripheral component during the update are output by the control apparatus as the first control output after coupling. This results in the additional advantage that the process can continue to be actively regulated during the update, that is to say a change in the process state can also be actively regulated by the further control apparatus and the control apparatus changed by the update can then smoothly intervene in the changed process sequence.

As already stated, the invention also includes a control apparatus which is designed to carry out an embodiment of the method according to the invention. The control apparatus according to the invention is preferably in the form of a programmable logic controller (PLC).

Finally, the invention also includes a process automation installation having at least one peripheral component which is designed to carry out the process, that is to say, for example, to produce electrical energy from coal or on the basis of a nuclear fission process, to fill containers, to produce products, for example to cast metal objects, or to regulate a temperature, for example in a building.

The automation installation according to the invention has an embodiment of the control apparatus according to the invention. The automation installation according to the invention has the advantage that the control apparatus can be provided with updated operating software without the process having to be interrupted for this purpose.

According to one development of the automation installation according to the invention, the latter has at least one further control apparatus, which is preferably likewise an embodiment of the control apparatus according to the invention, in addition to the control apparatus, wherein all control apparatuses are coupled via a synchronization connection for the purpose of synchronizing regulator states. This results in the advantage that a highly available, redundant regulating system is provided for the automation installation, in which the process can be alternately regulated by one of the control apparatuses in each case and no sudden changes or surges are produced in the profile of the control outputs output to the at least one peripheral component when changing between the control apparatuses.

BRIEF DESCRIPTION OF THE DRAWING

One exemplary embodiment of the invention is described below. In this respect.

DETAILED DESCRIPTION OF THE PREFERRED EMBODIMENTS

The exemplary embodiment explained below is one preferred embodiment of the invention. However, in the exemplary embodiment, the described components of the embodiment are each individual features of the invention which can be considered independently of one another and which also each develop the invention independently of one another and can therefore also be considered to be part of the invention individually or in a combination other than the combination shown. Furthermore, the embodiment described can also be supplemented with further features of the features of the invention which have already been described.

Figure 1:
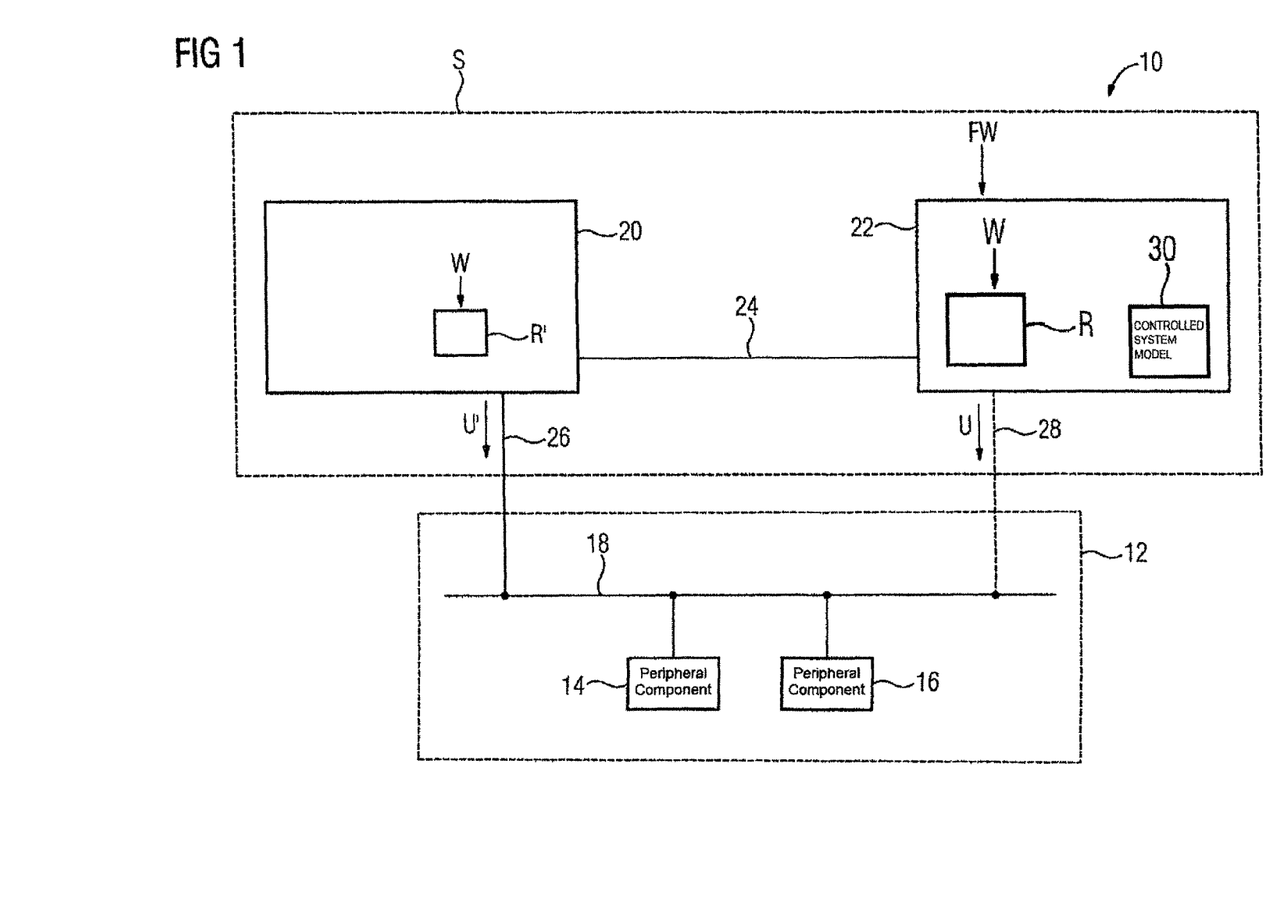
FIG. 1 shows a schematic illustration of one embodiment of the process automation installation according to the invention.

FIG. 1 shows a process automation installation or automation installation or installation 10 for short. The installation 10 may be, for example, a power plant, for example a coal-fired power plant or a nuclear power plant, a district heating plant, a bottling installation or a heating installation.

A process 12 is regulated in an automated manner in the installation 10, that is to say the production of electrical energy from a nuclear fission process in the case of a nuclear power plant, for example. For this purpose, the process 12 can be monitored and controlled by peripheral components 14, 16 and further peripheral components (not illustrated). For example, the peripheral component 14 may be a sensor and the peripheral component 16 may be an actuator. The peripheral components 14, 16 can be coupled to control apparatuses 20, 22 via a communication network 18. Only one control apparatus may also be provided or more than the two control apparatuses 20, 22 illustrated may also be provided. Each control apparatus 20, 22 may respectively be in the form of a PLC or a computer with its own operating system, for example.

The control apparatuses 20, 22 may be coupled via a synchronization connection 24 for the purpose of interchanging synchronization data. The synchronization connection 24 illustrated in FIG. 1 is only a symbolic illustration. The synchronization data may also be interchanged via the communication network 18, for example.

The control apparatuses 20, 22 constitute a highly available installation controller S, in which case, at a given time, only one control apparatus 20, 22 respectively transmits control values, which are referred to here in summary as the control output U, U', to the peripheral components 14, 16 via an active control connection 26 and via the communication network 18. The control apparatus which is inactive in the meantime, here the control apparatus 22, is decoupled from the process 12, which is illustrated in FIG. 1 by means of a dashed control connection 28. Each control output U, U' may be formed, for example as a vector, from individual control values for the peripheral components 14, 16 for a respective regulating cycle.

The highly available installation controller S is therefore distinguished by the following fundamental features. Two or more control systems, here the control apparatuses 20, 22, are coupled to one another via the synchronization connection 24. The peripheral components 14, 16 connected to the system may be operated, in principle, by both systems, that is to say can be regulated via respective regulators R, R' in such a manner that a desired value specification W is set in the process 12. One of the two subsystems is the master with respect to the peripheral components 14, 16 connected to the control system S, the control apparatus 20 in the situation shown in FIG. 1. This means that control outputs U, U' are carried out only by one of the subsystems.

So that both subsystems, that is to say the control apparatuses 20, 22, can run in a synchronous manner, they can be synchronized at predefined intervals of time via the synchronization connection 24. Different forms can be effected with respect to the synchronization frequency and its scope, which influences the downtime when changing over between the control apparatuses. In order to uniquely identify the faulty system during the changeover in the event of a fault, a corresponding system diagnosis can be provided, as is known per se from the prior art.

In the example shown, it is assumed that the process 12 was initially regulated by the control apparatus 22 and an update for operating software or firmware of the control apparatus 22 then became necessary, that is to say the operating software of the control apparatus 22 was intended to be replaced with new firmware FW. For this purpose, the control apparatus 22 was decoupled from the process 12 and the process 12 was regulated by the control apparatus 20. This change between the control apparatus 22 and the control apparatus 20 during regulation of the process 12 was carried out smoothly in this case, that is to say the process 12 was continued without interruption and there was also no or only an insignificant change in the process sequence 12. The firmware FW can now be loaded onto the decoupled control apparatus 22, while the process 12 continues to be operated. After the update, the control apparatus 22 can again likewise smoothly assume the regulation from the control apparatus 20.

For the smooth transition of the regulation to the control apparatus 20, the control apparatus 22 carries out a method for estimating the effects on the process on the basis of a controlled system model 30. This estimation reduces the risk of an erroneous assessment when stipulating a starting time for the update.

Figure 2:
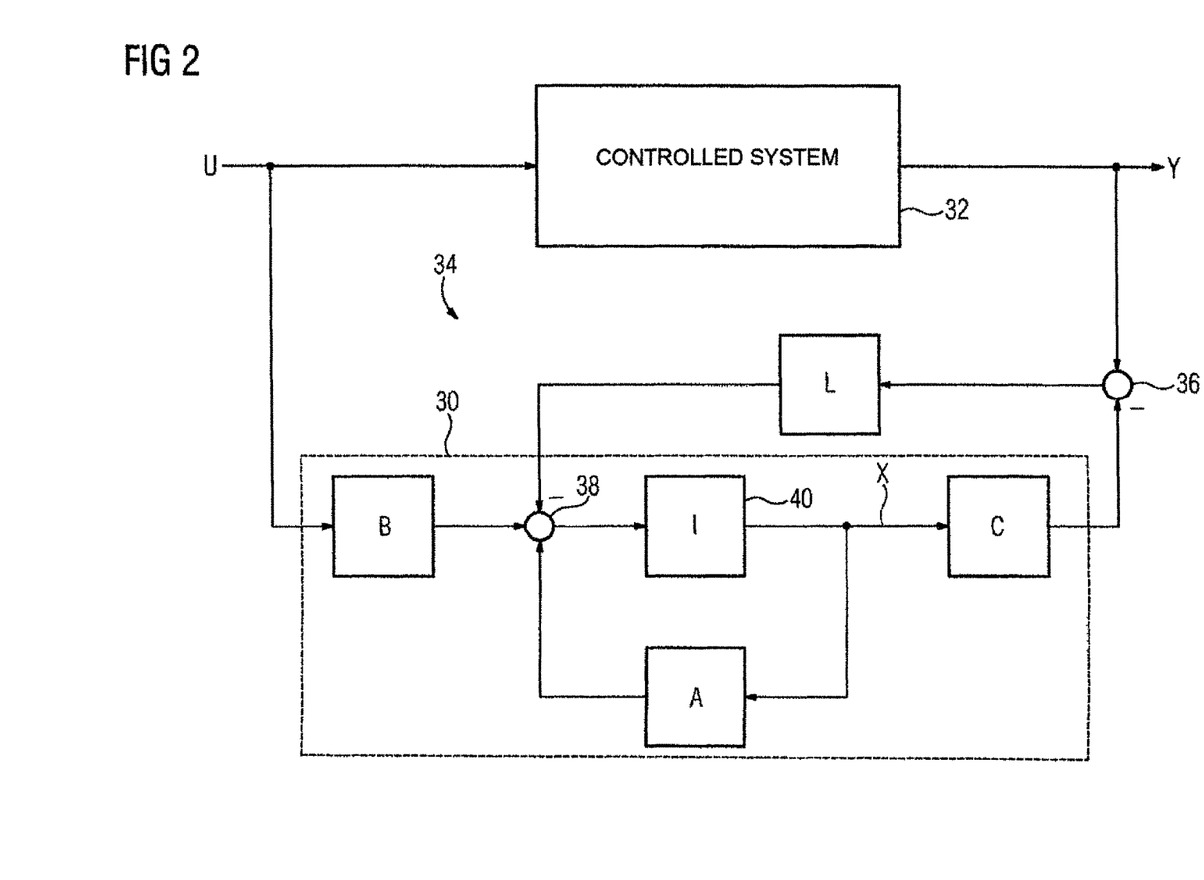
FIG. 2 shows a signal flow diagram for regulation which can be carried out by a control apparatus of the automation installation from FIG. 1.

The controlled system model or model 30 may be, for example, as illustrated in FIG. 2, the model 30 of a controlled system 32 provided by the process 12. The model 30 can be used to simulate or predict the effect of a downtime which arises between the time at which the control apparatus 22 is decoupled and the coupling of the control apparatus 20.

The model 30 could be gathered, without any additional effort, from the regulatory application, that is to say the engineering data for the installation 10. When engineering the installation 10 for the purpose of configuring or designing the regulation of the process 12 by one of the control apparatuses 20, 22 in each case, it may be the case that some state variables of the process 12, that is to say temperatures or other physical variables for example, have to be indirectly determined because they cannot be directly measured or can be measured only with an undesirably large amount of effort and therefore have to be estimated. An observer method, for example a Luenberger observer 34, can be used for this purpose, for example. The observer 34 illustrated by way of example in FIG. 2 simulates the effects of the control output U from the control apparatus 30 on the controlled system 32, that is to say the process state of the process 12, in order to hereby determine internal state variables of the controlled system 32. In this case, the matrices A, B and C illustrated in FIG. 2 describe, in a manner known per se, the dynamic behavior of the controlled system 32 when the control output U, which changes over time, is applied. The matrix L is a correction matrix for compensating for an observation error which is determined at the subtraction point 36. Starting from a subtraction point 38, an integrator 40 is used to determine a successor state, that is to say a state vector estimated for a next observation time.

The sequence of state vectors determined in this manner for a plurality of future times produces a state trajectory.

The model 30 can now also be used to calculate the behavior of the controlled system 32 in the event of a changeover, that is to say during the downtime T.

Figure 3:
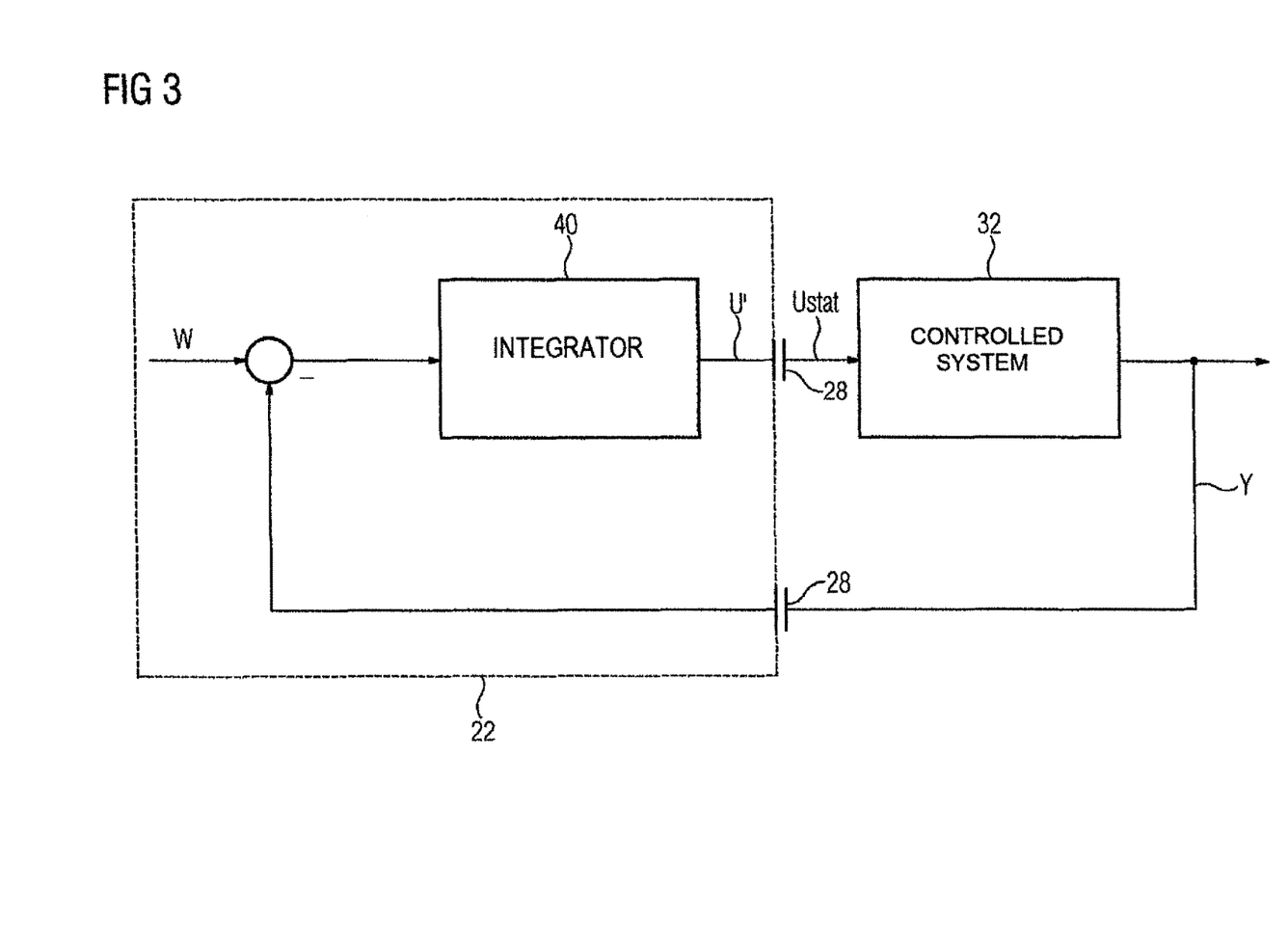
FIG. 3 shows a signal flow diagram for the controlled system which is present during an update of the control apparatus.

The changeover event is characterized in that both the input data Y, which can be observed in the controlled system 32, and the output data U from the control apparatus 22 while it is decoupled cannot be updated for the period of time of the downtime, that is to say can be interchanged between the control apparatus 22 and the process 12. During this period of time or downtime, the controlled system 32 is disconnected from that integrator 40 of the control apparatus 22 which is intended to be used to regulate a desired value specification W in the process 12. As illustrated in FIG. 3, the controlled system 32 therefore cannot be influenced by the control apparatus 22. The control loop formed by the control apparatus 22 and the controlled system 32 is therefore separated, that is to say an open chain arises.

During the downtime, the regulator R can neither read new input signals Y from the process 12 nor update the outputs U for the process 12.

Therefore, the communication network 18 is designed to the effect that the peripheral output retains its last value during the downtime, that is to say the controlled system 32 receives a stationary control output Ustat. A corresponding communication network 18 may be formed, for example, on the basis of a Profibus network in which time-slot-oriented transmission of control data rather than packet-oriented transmission of control data is carried out. Retaining the values for the individual time slots, that is to say not overwriting or deleting the previously transmitted values, makes it possible to produce the stationary control output Ustat. The last input vector, that is to say the stationary control output Ustat, then continues to be applied to the controlled system 32 during the downtime. This results in a state trajectory of the state variables of the controlled system 32 which is independent of the control output U from the control apparatus 22 during the downtime. Depending on the system parameters, the state variables of the controlled system, for example a boiler temperature, change in such a manner that they can reach a value critical to the process. In such a case, the failover downtime of the control system which is used and comprises the control apparatuses 20, 22 would become too long for the process 12 to be controlled. However, the expected downtime is a known characteristic variable of the installation controller S used. If the expected downtime is known, however, it is possible to check whether particular state variables can actually reach a critical value during the downtime or what stationary control output Ustat must be applied to the process 12 during the downtime in order to be able to carry out the firmware update without risk.

In this case, the following assumptions can be made without significantly restricting the functionality. There is a safe configuration for the control output, that is to say a safety control output, that is to say, if the period for safe operation in the open chain is exceeded, a safety system (not illustrated) can output the safety control output to the peripheral devices 14, 16 via the communication network 18. However, this measure terminates useful operation and should therefore be avoided. The operating software on the control apparatuses 20, 22 supports the smooth restart, that is to say corresponding control output values can be deliberately set, with the result that, after the control apparatus 22 has been coupled to the communication network 18 again, a predefinable vector of a control output containing restart values can be output independently of the current state of the regulator R.

Figure 4:
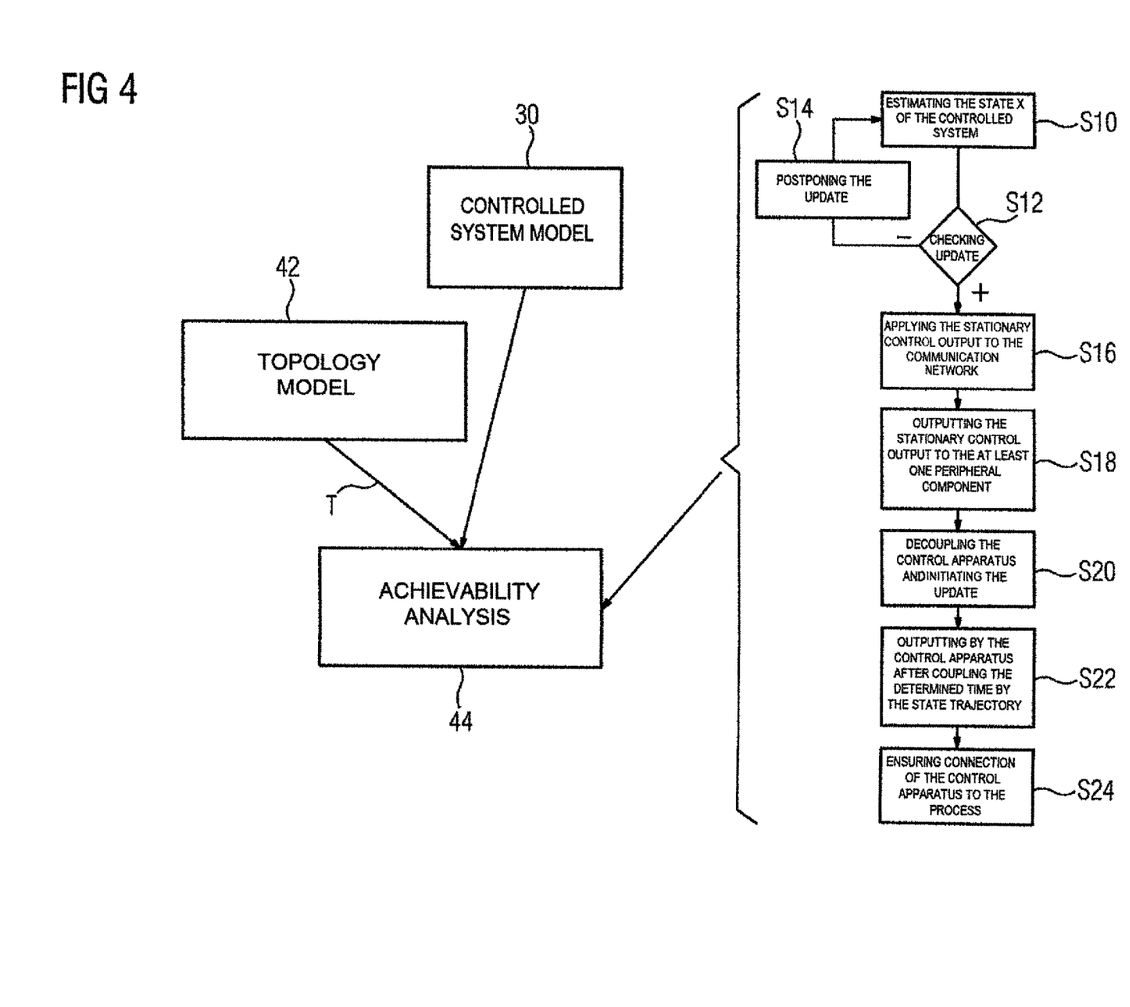
FIG. 4 shows a flowchart for illustrating one embodiment of the method according to the invention which can be carried out by the control apparatus.

FIG. 4 is used below to describe how the control apparatus 22 is initially decoupled from the process 12 for the firmware update at a safe starting time for the update and is then coupled to the process 12 again after a successful update so that the control apparatus 22 continues to regulate the process 12 instead of the control apparatus 20.

The basis is a description of a set V of prohibited states, for example as polytopes or polyhedra. The model 30 of the regulated process 12 may be, for example, a linear or non-linear model, in which case a non-linear model may have the following general form:

$$d(X(t))/dt = f(X(t), U(t), D(t)), X(t0) = X0$$

In the formula, the operator d( )/dt is the mathematical derivative with respect to time, X is the state vector, that is to say the operating state, of the controlled system 32, U is the control output, D is a vector describing the interfering influences, and X0 is an initial condition, that is to say an operating state at a predefined time 0, for example the current time. The function f( ) describes the functional relationship.

FIG. 4 shows how an achievability analysis 44 is carried out on the basis of the model 30 and a topology model 42 of the installation 10, which achievability analysis can simulate a state trajectory starting from the initial operating state X0. The downtime T, for example, can be determined on the basis of the topology model 42.

In a step S10, the state X of the controlled system 32 is continuously estimated on the basis of the model 30 by activating the state observer 34, for example according to Luenberger. The desired operating point, as is predefined by the desired value specifications W, is approached and the process 12 is regulated to the operating point. An easing of the process values is then awaited, that is to say possible transient responses may decay. The result is therefore stationary operating conditions, with the result that the following apply: U'=Ustat and X=X0. For this current state t1, the vector containing the operating state values, that is to say the operating state X, is precalculated or simulated for future times t using the achievability analysis 44 on the basis of the model 30 of the initial condition, that is to say the initial operating state X0, and assuming a constant control output Ustat, for which purpose the above formula is then modified:

$$d(X(t))/dt = f(X(t), U\text{stat}, D(t)), X(t0) = X0$$

In this case, the interfering influences D can be estimated or can likewise be kept constant. Solving the differential equation results in a set E(t) of achievable operating states as the result of the achievability analysis for the future times t.

The first time tv at which the intersection E(tv) with the set V of prohibited states is not empty, that is to say the process 12 has assumed an impermissible operating state, is then determined. Each of the preceding times t<tv at which the intersection of E(t) with V is empty determines a permissible time horizon tvo for safe operation. This time horizon tvo can be conservatively shortened further by a buffer time for safety reasons.

In a step S12, it is possible to check whether the period [t0, t0+tvo] suffices for the desired measure, that is to say the firmware update. If this is not the case, which is symbolized in FIG. 4 by means of a minus sign, (see step S14) it is possible to wait for a particular waiting time, that is to say the update can be postponed before an achievability analysis is again carried out for a subsequent time t1. The process 12 is not interrupted in this case.

If said period is greater than the time T, the process is continued in a step S16. In step S16, the stationary control output Ustat is applied to the communication network 18 and an acknowledgement from the peripheral components 14, 16 is awaited. In step S18, the stationary control output Ustat is output to the at least one peripheral components 14, 16. The control apparatus 22 can then be decoupled from the process 12 and the update can be carried out in step S20. In this case, a takeover signal can also be transmitted to the control apparatus 20, so that the latter regulates the process 12, with the result that the firmware update can be continued for any desired length of time. After the control apparatus 22 is available for the regulation again, it can be started and can be synchronized with the control apparatus 20 via the synchronization connection 24, for example, with the result that the control apparatus 22 is now available for the regulation again. Restart values which can be determined from the synchronization, for example, or can correspond to the stationary control output Ustat or can be determined using the state trajectory, can be used as the first control output U in step S22, with the result that smooth connection of the control apparatus 22 to the process 12 is ensured in step S24.

It is recommended to carry out the achievability analysis so quickly that the process 12 does not move too far away from the operating state X0 starting from the current time t0 at which the achievability analysis is carried out starting from the initial operating state X0.

In the example shown, a controlled system model which is already present and is used for regulatory purposes, that is to say the model 30, is therefore additionally used to assist the user when selecting a highly available automation solution.

Overall, the example therefore results in a model-based assistance system for planning and carrying out a software update in a highly available automation system.

What is claimed is:

1. A method for stipulating a starting time for an update for a control apparatus, said control apparatus controlling at least one peripheral component in a process automation installation, said method comprising:
    producing a control output, said update requiring at least a predetermined downtime;
    detecting a current operating state for at least one peripheral component;
    using the detected operating state as a basis for a controlled system model of a process, said controlled system model simulating what state trajectory the at least one peripheral component runs through within the downtime for a predetermined stationary control output;
    checking to determine whether the state trajectory is within a range of permissible operating states, wherein the range of permissible operating states includes operating states which the process and/or the at least one peripheral component has a permissible operating value; and
    starting the update only when the state trajectory is entirely within the range of permissible operating states for the downtime.

2. The method of claim 1, further comprising:
    outputting the stationary control output to the at least one peripheral component to start the update;
    decoupling the control apparatus; and
    initiating the update during an interruption-free operation of the process.

3. The method of claim 1, further comprising emitting a takeover signal for outputting a further control output to a further control apparatus after the update has been started and within the downtime.

4. The method of claim 3, further comprising:
    providing a predetermined safety control output, said predetermined safety control output controlling the at least one peripheral component into a predetermined safe operating state; and
    outputting the safety control to the at least one peripheral component if an error state is signaled in the control apparatuses and/or the at least one peripheral component after the update has been started.

5. The method of claim 3, further comprising:
    coupling the control apparatus to the at least one peripheral component again after the update;
    restarting values determined via synchronization with the further control apparatus coupled to the at least one peripheral component during the update; and
    outputting by the control apparatus as the first control output after coupling.

6. The method of claim 1, wherein the controlled system model includes a model of a controlled system which includes the at least one peripheral component.

7. The method of claim 1, further comprising:
    determining a time at which the state trajectory has an impermissible operating state for a first time to check the state trajectory via a simulation;
    using the time to determine a maximum permissible time horizon; and
    checking to determine whether the downtime is less than a time horizon or less than the time horizon minus a predetermined buffer time.

8. The method of claim 7, further comprising:
    coupling the control apparatus to the at least one peripheral component again after the update;
    restarting values corresponding to the stationary control output or restarting values determined using the state trajectory; and
    outputting by the control apparatus as the first control output after coupling the determined time by using the state trajectory.

9. The method of claim 1, further comprising determining a further state trajectory for at least one further predetermined stationary control output trajectory if the state trajectory is at least partially outside the range of permissible operating states within the downtime.

10. The method of claim 1, further comprising delaying the update when there is no permissible state trajectory.

11. A control apparatus for a process automation installation, said control apparatus stipulating a starting time for an update and being configured to:
    produce a control output, said update requiring at least a predetermined downtime;
    detect a current operating state for at least one peripheral component;
    use the detected operating state as a basis for a controlled system model of a process, said controlled system model simulating what state trajectory the at least one peripheral component runs through within the downtime for a predetermined stationary control output;
    check to determine whether the state trajectory is within a range of permissible operating states, wherein the range of permissible operating states includes operating states which the process and/or the at least one peripheral component has a permissible operating value; and
    start the update only when the state trajectory is entirely within the range of permissible operating states for the downtime.

12. The control apparatus of claim 11, constructed in the form of a programmable logic controller (PLC).

13. A process automation installation having at least one peripheral component and a control apparatus, said control apparatus stipulating a starting time for an update, said process automation installation comprising:

- at least one peripheral component; and
- a first control apparatus configured to:
- produce a control output, said update requiring at least a predetermined downtime;
- detect a current operating state for at least one peripheral component;
- use the detected operating state as a basis for a controlled system model of a process, said controlled system model simulating what state trajectory the at least one peripheral component runs through within the downtime for a predetermined stationary control output;
- check to determine whether the state trajectory is within a range of permissible operating states, wherein the range of permissible operating states includes operating states which the process and/or the at least one peripheral component has a permissible operating value; and
- start the update only when the state trajectory is entirely within the range of permissible operating states for the downtime.

14. The process automation installation of claim 13, further comprising a second control apparatus and a synchronization connection for synchronizing regulator states, said first and second control apparatuses being coupled via the synchronization connection.

\* \* \* \* \*

UNITED STATES PATENT AND TRADEMARK OFFICE
CERTIFICATE OF CORRECTION

PATENT NO. : 10,310,470 B2
APPLICATION NO. : 15/305926
DATED : June 4, 2019
INVENTOR(S) : Thomas Grosch and Jan Richter It is certified that error appears in the above-identified patent and that said Letters Patent is hereby corrected as shown below:

On the Title Page

[73] Assignee: correct the assignee's name to read --Siemens Aktiengesellschaft--.

Signed and Sealed this
Thirtieth Day of July, 2019

Andrei Iancu
*Director of the United States Patent and Trademark Office*